United States Patent [19]

Yazaki et al.

[11] 4,256,687
[45] Mar. 17, 1981

[54] PROCESS FOR PRODUCING MOLDED ARTICLES

[75] Inventors: Katsuya Yazaki, Kawasaki; Takashi Inoue; Shohji Mori, both of Yokohama, all of Japan

[73] Assignee: Nippon Petrochemicals Co., Ltd., Tokyo, Japan

[21] Appl. No.: 958,600

[22] Filed: Nov. 7, 1978

[30] Foreign Application Priority Data

Nov. 11, 1977 [JP] Japan .................... 52-134640

[51] Int. Cl.$^3$ .............................. D01D 5/12
[52] U.S. Cl. .................... 264/210.1; 264/544; 264/175; 264/280; 264/294
[58] Field of Search ............ 264/175, 210.1, 544, 264/294, 280; 242/157 R

[56] References Cited

U.S. PATENT DOCUMENTS

| | | | |
|---|---|---|---|
| 3,080,134 | 3/1963 | England et al. | 242/157 R |
| 3,080,135 | 3/1963 | Steijn | 242/157 R |
| 3,194,863 | 7/1965 | Williams et al. | 264/175 |
| 3,310,860 | 3/1967 | Gronholz et al. | 29/527.2 |
| 3,429,959 | 2/1969 | Salhofer | 264/175 |
| 3,478,138 | 11/1969 | Friesner | 264/175 |
| 3,504,075 | 3/1970 | Williams et al. | 264/175 |
| 3,732,349 | 5/1973 | Chen et al. | 264/175 |
| 3,852,387 | 12/1974 | Bortnick et al. | 264/175 |
| 3,988,086 | 10/1976 | Marshall et al. | 242/157 R |
| 4,085,187 | 4/1978 | Jenks et al. | 264/175 |

FOREIGN PATENT DOCUMENTS

| | | |
|---|---|---|
| 49-14575 | 2/1974 | Japan . |
| 49-69139 | 7/1974 | Japan . |
| 51-75761 | 6/1976 | Japan . |
| 51-91955 | 8/1976 | Japan . |

Primary Examiner—Jay H. Woo
Attorney, Agent, or Firm—Jordan and Hamburg

[57] ABSTRACT

A process for producing molded articles, such as cups, which comprises passing a crystalline polyolefin resin melt in sheet form through between rolls having a specified surface roughness and temperature while simultaneously contacting both faces of the resin melt with the rolls respectively, followed by still contacting at least one of the faces with the roll or other similar rolls to solidify the resin melt thereby obtaining a sheet having a specified surface roughness on each face, further passing the sheet through between at least one pair of rolls rotating in the direction opposite to each other and having therebetween a gap smaller than the thickness of the sheet while maintaining the sheet at lower than the crystalline melting point thereof thereby to obtain a rolled sheet and then molding the rolled sheet under pressure while maintaining the rolled sheet at specifically lower than the crystalline melting point thereof thereby to obtain the molded articles.

4 Claims, 1 Drawing Figure

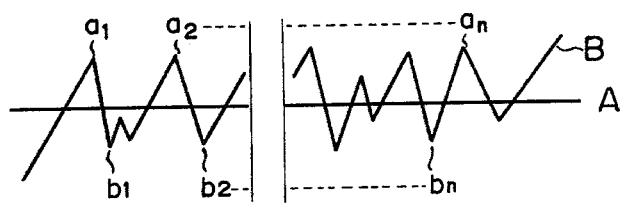

PROCESS FOR PRODUCING MOLDED ARTICLES

This invention relates to a process for producing articles, such as containers, by thermally molding a crystalline polyolefin resin sheet and also to the articles so produced. More particularly, it relates to a process for producing such articles having improved surface gloss and transparency from a crystalline polyolefin resin sheet having improved moldability and also to the improved articles so produced.

Crystalline polyolefin resins such as polypropylene, have many excellent properties such as heat resistance, moisture permeation resistance, impact resistance, low specific gravity and freedom of environmental pollution, as compared with polyvinyl chloride resins, polystyrene resins and the like which have heretofore been widely used in the thermoforming field, however, these polyolefin resins have hardly been used on an industrial scale since the sheets thereof will sag at the time of thermoforming and the resulting moldings such as containers are opaque and low in rigidity and the like. On the other hand, there have recently been proposed various applications of the crystalline polyolefin resins to the thermoforming.

For example, Japanese Patent Application Laying-Open Gazette No. 14575/74 discloses a process comprising heat molding crystalline polyolefin resins in solid form at a temperature lower than their melting point to improve the resulting moldings in transparency. Said process is particularly effective in heat molding polypropylene, however, it will exhibit remarkably lowered effectiveness on the transparency of moldings if the moldings are prepared by molding comparatively high molecular weight resins having a M.F.I. (melt flow index) of 4 or less. Thus, to eliminate such a disadvantage, it is necessary to use resins which have a high M.F.I. and are therefore very disadvantageous in the impact resistance of moldings to be produced therefrom. Further, in a case where the area of resin sheets to be molded are broad such as a case where many moldings are produced from a sheet at one time or a case where large-sized moldings are produced by thermoforming, it is inevitable that the resin sheets heated prior to being molded will cause their sagging and undulation due to their own weight and thermal expansion. Other processes for improving the transparency are disclosed in Japanese Patent Application Laying-Open Gazettes Nos. 69139/74, 91955/76, etc.

Said Japanese Pat. Appln. Laying-Open Gazette No. 14575/74 discloses a process comprising changing a polypropylene sheet in crystal form to smectic state by melting and then rapidly cooling or quenching the sheet and then thermoforming the sheet in smectic state at a temperature lower than the melting point thereof. Said process is undoubtedly effective in obtaining transparency on the resulting molding, however, the speed at which the process may be carried out on an industrial scale is necessarily limited since the process requires a time enough to obtain the quenching effects by which the sheet is changed in crystal form to smectic state. If the said effects be desired to be obtained in a short time, an apparatus usable for this purpose will inevitably be a specifically designed one which is remarkably disadvantageous for industrial use. Further, in this known process, it is inevitable that resin sheets sag at the time of thermoforming.

Japanese Patent Publication Gazette No. 91955/76 disclose a process comprising rapidly cooling a petroleum resin-added polypropylene resin to obtain transparent sheets, however, this known process has the same problems still left unsolved as described in said Japanese Pat. Appln. Laying-Open Gazette No. 14575/74. It has been found by a confirmation test that thermally molded containers obtained by these known processes undoubtedly have improved transparency and are poor in so-called glass clearness since they appear to blur the light transmitted through the wall of the containers.

On the other hand, a try to eliminate the sagging of resin sheets at the time of thermoforming is disclosed in Japanese Pat. Appln. Laying-Open Gazettes Nos. 75761/76 and 14575/74. In the former, a polyolefin sheet is laminated on a sagging-free sheet of a resin different from polyolefin in attempts to solve the problem as to the sagging, however, this try is unsuitable for general use since it raise problems as to lamination means, selection of resins used and the like; while in the latter, the use of a heat molding temperature lower than the melting point of resins sheets to be thermoformed is surely advantageous over the use of a thermoforming temperature higher than said melting point in conventional molding methods, however, the use of broad resin sheets for obtaining merits of low costs will not thoroughly eliminate such sagging.

In attempts to solve such problems which have not perfectly been solved as yet, the present inventors made intensive studies and accomplished the present invention.

One of the essentials of the present invention is to use oriented resin sheets as the starting material. It would be easily thought of that the sagging of resin sheets will be avoided due to their shrinkage at the time of thermoforming if they are monoaxially or biaxially oriented sheets. However, it is technically difficult that polyolefin resin sheets having large thickness be stretched or drawn by applying tension thereto and it is generally very difficult to draw crystalline polyolefin resins uniformly in a region of comparatively low drawing ratios; to overcome these difficulties, it is required that apparatuses used be considerably modified and/or specialized thereby making impractical the commercial application of such drawing. The sheets drawn under a high drawing ratio by which comparatively uniform drawing is easy to effect, will tend to tear or else greatly warp in shape from an expected shape at the time of thermoforming even if they be molded without rupture, due to their high shrinkage.

In addition, even if uniformly drawn resin sheets of a low drawing ratio be obtained by application of tension to the original resin sheets thereby reducing their sagging at the time of thermoforming, the original sheets drawn will have a minutely roughened surface whether or not they have previously been subjected to "transparency" treatment such as said quenching treatment, whereby the resulting heat molded containers are still not perfectly transparent, that is, they are blurring.

As is seen from the above, the aforesaid drawing treatment by the application of tension cannot but be a still unsatisfactory one.

The aforesaid drawing method is now found to be an unsuitable one for obtaining oriented resin sheets as indicated above, and another method easily thought of at this point would be one for orienting resin sheets by rolling them with compression rolls (the rolling with compression rolls being hereinafter referred to simply as "rolling" for brevity) at a temperature lower than the melting or softening point of the resin sheets. It would be easily surmised that when the rolling method is substituted for the aforesaid drawing method, uniformly oriented resin sheets are obtained even at low drawing ratios thereby to solve the problems as to the sag of resin sheets. However, even in cases where the rolling method is employed, highly oriented sheets obtained are as unsuitable as sheets for use in thermoforming because of their orientation or directionality as the drawn sheets obtained by the drawing method. In this case, it has been found that resin sheets which may be subjected to thermoforming without their sagging are those having been rolled in a rolling ratio expressed by a ratio of 1.1–2.0 between the thickness of the original sheet and that of the rolled sheet.

However, polyolefin resin sheets which have only been rolled in a low rolling ratio, have no tendency of sagging at the time of thermoforming but they require to be subjected to some other treatments such as quenching treatment as previously mentioned in order to obtain therefrom moldings having desired transparency. To this end, apparatuses specifically designed for carrying out the quenching treatment are needed and the production speed is necessarily limited.

It has now been found that if there are thermoformed resin sheets which have been rolled under certain specific rolling conditions, for example, in a low rolling ratio of 1.1–2.0 at a temperature lower than the melting point of the resin sheets, then the rolled resin sheets will exhibit substantially no sagging at the time of thermoforming and the resulting moldings will be remarkably improved in transparency. This invention is based on this finding or discovery.

This invention is very significant in that the rolling of resin sheets in such a low rolling ratio as has no adverse effects on the conduct of thermoforming will result in solving the problem as to sagging of the sheets and improving greatly the resulting thermoformed containers in transparency.

This invention will be further detailed hereinbelow.

According to this invention, a non-oriented resin sheet (hereinafter referred to as "original sheet") used herein is obtained by subjecting a crystalline polyolefin melt in sheet form to suitable cooling treatment to provide it with a predetermined surface condition (roughness), and the original sheet so obtained is rolled in solid phase in a rolling ratio of 1.1–2 (ratio between the thickness of the original sheet and that of the rolled sheet) at a temperature lower than the melting point of the sheet and then thermoformed under pressure, for example, a hydraulic differential pressure or a pressure by a press at a temperature lower than the melting point of the sheet.

First of all, the original resin sheet is obtained by flat die extrusion or calendering. The important things to be considered at this point are the temperature of the polyolefin melt sheet at the time of it being in melted state, the surface temperature of the chilling rolls (polishing rolls) and the surface roughness (or smoothness) of the resulting original sheet. In other words, an average cooling speed or rate for solidification should not be retarded beyond a certain level, this meaning that the polyolefin sheet should be cooled at such a rate as to form a skin layer (microcrystalline layer) therein in order to obtain the original sheet.

It is possible to form the skin layer in the polyolefin sheet by passing the polyolefin sheet at 220°–250° C. in contact with rolls the surface of which is maintained at 50° C. or lower to cool and solidify the sheet. If the polishing rolls having a surface temperature of higher than 50° C. be used, then the surface layer of the polyolefin sheet will not readily form a microcrystalline layer and moldings having decreased transparency will be obtained. According to this invention, it is necessary that the original sheet obtained should have a surface roughness of 0.7 $\mu$RMS or less. To this end, in practice, the polyolefin sheet is contacted with cooling metallic rolls each having a surface roughness corresponding to 1S (as determined according to JIS (Japanese Industrial Standard) B0601-55) or lower in such a manner that both the sides of the sheet are simultaneously contacted with the rolls respectively immediately before the sheet solidifies at its sides. Any means may be used so long as they can provide the sheet with a surface roughness of 0.7 $\mu$RMS or lower. Said cooling rate may be achieved without the use of a special cooling means such as a chiller or a large-capacity cooling water circulation apparatus since sheets are obtained at a rate of 3–10 m/min. which is a commercial operational rate by the use of an ordinary extrusion method (on T die-polishing rolls). The thickness of the original sheet obtained is preferably in the range of 0.2–2.0 mm. The original sheets having an about 0.2-mm thickness may be produced at a higher rate; on the other hand, those having a thickness of more than 2 mm tend to be softened again on the surface which was once treated to have a predetermined surface roughness by the use of a suitable means such as rolls, due to the heat remaining in the interior of the sheet, whereby the control of the surface roughness is made difficult. The preferable thickness of the original sheets are in the range of 0.3–1.0 mm. Said cooling rate is such that both the surface layers of the polyolefin sheet form a skin layer in which are developed fine crystals of 100–200 Ångstrom in size, as viewed from a thickness cross-section of the original sheet.

Polypropylene for example, does not form a smectic structure therein and, therefore, the degree of transparency of the resulting sheet is not wholly satisfactory although it is somewhat satisfactory as compared with that of sheets obtained at lower cooling rates.

Such rapid cooling or quenching as is necessary for producing a smectic structure is not a factor to decrease the effects of this invention, however, it is insignificant and will result in remarkably limiting the rate of manufacture of the original sheets due to the need of the rapid cooling rate or in requiring a specific apparatus for carrying out the rapid cooling.

The original sheets so obtained are then rolled with compression rolls. In this case, the temperature of the original sheets should preferably be lower than the melting point thereof by 30° C. or less. However, particularly for polypropylene including copolymers thereof, a temperature of 70°–120° C. is preferable and the best results are obtained at 90°–110° C. In general, if the temperature used is too low, then the pressure applied to the sheet needs to be too high thereby requiring more strongly-built rolls for rolling. In cases where polypropylene sheets are rolled at higher than 120° C., they tend to be finely roughened on the surface; the reason for this is not clarified yet but is considered to be due to melting of the atactic polypropylene component in the sheet.

For rolling, it is preferable to use rolls the surface of which is placed with hard chromium. It is the best that the surface of the plated rolls be smooth, however, it is satisfactory that the surface roughness thereof be 0.8S or less. The rolling ratios used herein should not be excessively high to avoid an adverse effect, that is, directionality which might otherwise be caused. Thus, the rolling ratios should be in the range of 1.1–2, preferably 1.2–1.5.

The diameter of the rolls is not particularly limited, but the value of L/D (ratio of length to diameter) is preferably in the range of 2.0–2.5. The use of rolls having an unduly low L/D will result in an increase in apparatus cost, while the use of rolls having an unduly high L/D will result in the production of the original sheets in which the longitudinal central portion is made thicker than the remaining brim portions due to the bending of the rolls caused by the force thereof applied to the sheet.

It is preferable that the rolls be of a drilled roll type in order to secure satisfactory temperature distribution all over the surface of the rolls and higher strength on the rolls.

Further, the use of a preheating device before the introduction of the sheet into the nip of the rolls will soften the sheet thereby enabling the sheet to pass through the rolls smoothly.

The rolled sheets from the rolling rolls are soon cooled with cooling rolls. If a thermoforming apparatus is connected to a rolling machine for carrying out the rolling and thermoforming continuously, then such cooling may be dispensed with.

It is seemingly not easy to differentiate the rolled original sheets according to this invention in the degree of transparency from comparative rolled sheets obtained by rolling sheets obtained by the use of such a low cooling rate that no skin layers are formed in the starting polyolefin sheet or from comparative rolled sheets obtained by rolling sheets with a surface roughness of higher than 0.7 $\mu$RMS produced due to little attention to surface roughness at the time of film-forming. However, it is possible to differentiate clearly the degree of transparency of containers obtained by thermoforming the rolled sheets according to this invention from that of containers obtained by thermoforming the comparative rolled sheets.

The rolled sheets according to this invention are thermoformed under a pressure of usually at least 2.5 Kg/cm$^2$. This thermoforming method is typified by an air-pressure forming method or a press forming method using dies. An ordinary vacuum forming method has a poor shaping capability and does not enable the sheet to closely contact with the inner wall of the dies thereby making it difficult to obtain molding the shape of which is perfectly in compliance with the inner shape of the dies. It is necessary that the brim portion of the rolled sheets be firmly held at the time of thermoforming.

In cases where are used dies by which several containers are simultaneously formed, it is not necessary that the rolled sheets be clamped for each of the dies. The temperature of the sheet at the time of forming is maintained at a temperature lower than the melting point of the sheet. When the temperature of the sheet exceeds the melting point thereof, the orientation of the sheet will vanish and the transparency thereof will remarkably decrease. The temperature of the rolled sheet must be a temperature lower than the melting point of the sheet by 40° C. or less. The use of the rolled sheet at a temperature lower than the melting point thereof by more than 40° C. will result in the production of molded containers having a shape remarkably disagreeable to the expected shape (the inner shape of dies used). The preheating may be effected by any means, but it is preferable to employ non-contact type preheating means such as hot gas or infra-red ray radiation.

Thermoformed containers so obtained have glass-clear transparency, sufficient surface gloss and high rigidity obtained due to orientation as compared with those obtained by molding sheets which have only been perfectly and fully quenched (or rapidly cooled) in such a manner that the quenching effect is produced throughout the whole thickness of the sheet. Further, according to this invention, even polyolefin may be thermoformed without causing its specific sagging.

The crystalline polyolefin resins used in this invention include homopolymers of an olefin such as propylene, ethylene and butene-1, copolymers composed mainly of these olefins, and mixtures of these homopolymers and copolymers, among which polypropylene and copolymers composed mainly of propylene are particularly preferred.

The polyolefin resins used herein may be incorporated with antistatic agents, antioxidants, ultraviolet light absorbers and other ordinary additives without adverse effects. They may also be incorporated with nucleating agents for promoting the formation of skin layers.

The effects or advantages of this invention does not vary depending on the magnitude of molecular weight of resins used so long as the resins are of the same kind. This suggests that this invention makes it possible to use high molecular weight polyolefin resins in the production of containers therefrom without impairing the transparency of the resulting containers thereby indicating that this invention is advantageous in improving the resulting containers in strength.

As is seen from the above, the advantages of the process of this invention are that polyolefin resin sheets are prevented from sagging at the time of thermoforming, that specialized cooling devices are not required, that polyolefin resins having any molecular weight may be used and that the resulting molded containers have improved transparency. Particularly, the possibility of use of any polyolefin resins irrespective of their molecular weight is advantageous from the view-point of improvements in strength of the resulting containers. Thus, it would be of great significance to commercially practice the process of this invention.

EXAMPLE 1, COMPARATIVE EXAMPLE 1

This Example was intended to indicate the effects of rolling with compression rolls in comparison with the Comparative example.

Commercially available isotactic polypropylene (homopolymer of propylene) having M.F.I. 2.0, density 0.90 and melting point 168° C., was processed by flat die extrusion into original sheets having a surface roughness of 0.3 $\mu$RMS and a thickness of 0.6 mm. The original sheets so obtained were rolled by passing them through the gap between a pair of rolls to obtain rolled sheets having a thickness of 0.43±0.04 mm. The thus-obtained rolled sheets were subjected to air-pressure molding (plug assist) to yield cup-like containers. The conditions (in Example 1) under which the isotactic polypropylene was extruded to obtain the original sheets, those under which the original sheets were rolled and those under which the rolled original sheets were thermoformed, are indicated as follows.

Conditions for extrusion of resins into sheets:
  Extrusion system:
    T die, three vertical polishing roll system, surface roughness 0.4S
    die lip: 0.7 mm
    lip-roll nip distance: 15 cm
    polishing roll surface temperature: 40°±1° C.
    polishing roll surface diameter: 250 mm $\phi$
    resin temperature: 245°±1° C.
    Take-off speed: 4 m/min.
Conditions for rolling
  Sheet preheating temp.: 120°-1° C.
  Compression roll surface temp.: 110°±0.5° C.
  Compression roll dimension: 220 mm $\phi \times 500^L$
  Compression roll surface roughness: 0.4S
  Rolling speed (Take-off): 5.6 m/min.
  Roll nip gap: 0.36 mm
Conditions for thermoforming
  Sheet preheating temp.: about 150° C.
  Sheet preheating time: 17 sec.
  Sheet forming time: 5 sec.
  Compressed air pressure: 4 Kg/cm$^2$
  Plug surface: Covered with flannel cloth
  Plug surface temp.: about 60° C.
  Plug volume: tip diameter 45 mm, height 30 mm, bottom diameter 65 mm
  Female die cavity volume: diameter of opening 70 mm, bottom diameter 60 mm, depth 40 mm
  Forming capacity: 4 cups/shot

EXAMPLE 2, COMPARATIVE EXAMPLE 2

This Example was intended to indicate the effects of resin temperatures used at the extrusion of original sheets from polyolefin resins, in comparison with the Comparative example.

The procedure of Example 1 was followed except that resin temperatures used at the time of extrusion were varied to obtain thermoformed containers as shown in Table 2. The results are indicated in Table 2.

This Example clearly shows the effects of resin temperatures used at the time of extruding the resin into the original sheets. Further, in this case, the same results were obtained even when the die lip gap and the die lip-polishing roll nip distance were varied in the usually practicable range.

TABLE 2

|  | Resin temp. (°C.) | Original sheet Haze (%) | Rolled sheet Haze (%) | Properties of container ||||| 
|---|---|---|---|---|---|---|---|---|
|  |  |  |  | Bottom thickness (mm) | Bottom haze (%) | Side wall thickness (mm) | Wall haze (%) | Wall gloss (%) |
| Example |  |  |  |  |  |  |  |  |
| 2-1 | 220 | 64 | 37 | 0.18 | 7.0 | 0.13 | 5.3 | 160 |
| 2-2 | 245 | 62 | 36 | 0.18 | 7.5 | 0.10 | 5.1 | 167 |
| Comparative example |  |  |  |  |  |  |  |  |
| 2-1 | 200 | 68 | 39 | 0.17 | 17.8 | 0.11 | 12.4 | 103 |
| 2-2* | 260 | 62 | 32 | 0.15 | 37.0 | 0.13 | 19.0 | 74 |

*Raised to M.F.I. 3 due to the high resin temperature.

As is seen from the above Table, the resin temperatures used in this invention should be in a certain proper temperature range, and the use of a temperature in the certain proper temperature range will result in the production of formed containers having remarkably improved transparency and gloss.

EXAMPLE 3, COMPARATIVE EXAMPLE 3

This Example was intended to indicate the effects of polishing roll surface temperatures. The procedure of Example 1 was followed except that polishing roll surface temperatures vary as shown in Table 3, thereby to obtain thermoformed containers. The results are shown in Table 3.

It is clearly seen from this Example how the resulting

TABLE 1

| | Original sheet Haze (%) | Rolled sheet Haze (%) | Rolling ratio Ratio of thickness between original and rolled sheets | Properties of containers ||||| Sagging of sheet at the time of thermoforming |
|---|---|---|---|---|---|---|---|---|---|
| | | | | Bottom thickness (mm) | Bottom haze (%) | Side wall thickness (mm) | Wall haze (%) | Wall gloss (%) | Buckling strength (kg) | |
| Example 1 | 62 | 36 | 1.4 | 0.18 | 7.5 | 0.10 | 5.1 | 167 | 2.9 | None |
| Comparative example 1 | 51 | 51 | — | 0.23~0.11 | 15.7~19.2 | 0.15~0.06 | 10.3~17.1 | 82 | 0.5 | Remarkable sagging *Non-uniformity of wall thickness appreciated |

As is apparent from the above Table, the rolling treatment according to this invention will have remarkably favorable effects on the transparency, gloss and rigidity of the resulting thermoformed containers and will prevent the rolled sheets from sagging at the time of thermoforming.

containers vary in transparency with a change in cooling temperature used at the time of formation of original sheets by forming. Further, in this case, the same results were obtained even when the die lip gap and the die lip-polishing nip distance were varied in the usually practicable range.

TABLE 3

| | Polishing roll Surface temperature (°C.) | Original sheet Haze (%) | Rolled sheet Haze (%) | Transparency of containers | | | | |
|---|---|---|---|---|---|---|---|---|
| | | | | Bottom thickness (mm) | Bottom haze (%) | Side wall thickness (mm) | Wall haze (%) | Wall gloss (%) |
| Example | | | | | | | | |
| 3-1 | 18 | 32 | 29 | 0.17 | 7.1 | 0.11 | 4.8 | 168 |
| 3-2 | 45 | 65 | 35 | 0.18 | 7.3 | 0.12 | 4.9 | 168 |
| Comparative example | | | | | | | | |
| 3-1 | 55 | 74 | 35 | 0.19 | 21.1 | 0.13 | 15.1 | 51 |
| 3-2 | 80 | 70 | 36 | 0.18 | 19.2 | 0.11 | 17.1 | 62 |

*In Example 3-1, the sheet take-off speed had to be limited to within 1.5 m/min. to maintain the polishing roll surface temperature at 18° C.

EXAMPLE 4, COMPARATIVE EXAMPLE 4

This Example was intended to indicate the effects of original sheet surface roughness.

The procedure of Example 1 was followed except that original sheets used were varied in surface roughness by using polishing rolls having surface roughnesses of 0.4S, 0.8S and 1.5S respectively as shown in Table 4, thereby to obtain thermoformed containers. The results are indicated in Table 4.

It is apparent from Example 1 that the surface roughness of the original sheets will have effects on the transparency of the resulting containers.

TABLE 4

| | Original sheet | | Rolled Sheet Haze (%) | Transparency of container | | | | |
|---|---|---|---|---|---|---|---|---|
| | Surface roughness (μRMS) | Haze (%) | | Bottom thickness (mm) | Bottom haze (%) | Side wall thickness (mm) | Wall haze (%) | Wall gloss (%) |
| Example | | | | | | | | |
| 4-1 | 0.3 | 62 | 34 | 0.20 | 7.7 | 0.11 | 5.4 | 162 |
| 4-2 | 0.7 | 64 | 36 | 0.18 | 7.5 | 0.10 | 5.1 | 167 |
| Comparative example | | | | | | | | |
| 4-1 | 1.1 | 72 | 35 | 0.18 | 21.0 | 0.12 | 12.2 | 60 |

EXAMPLE 5, COMPARATIVE EXAMPLE 5

This Example was intended to show the effects of rolling ratios (ratios of thickness). The procedure of Example 1 was followed except that original sheets had thicknesses of 0.45 mm, 0.47 mm, 0.86 mm and 1.08 mm respectively, and the rolling ratios were 1.05, 1.1, 2.0 and 2.5 respectively, to yield rolled sheets having a thickness of 0.43 mm, thus obtaining thermoformed containers. The results are as shown in Table 5.

As is clearly seen from this Example in view of Example 1, selection of suitable rolling ratios will have favorable effects on the transparency, rigidity and gloss of the resulting containers as well as on the thermoformability of rolled sheets.

TABLE 5

| | Rolled sheet Haze (%) | Rolling ratio Thickness ratio | Properties of container | | | | | | Sagging of sheet at the time of thermoforming |
|---|---|---|---|---|---|---|---|---|---|
| | | | Bottom thickness (mm) | Bottom haze (%) | Side wall thickness (mm) | Wall haze (%) | Wall gloss (%) | Buckling strength (kg) | |
| Example | | | | | | | | | |
| 5-1 | 39 | 1.1 | 0.17 | 7.6 | 0.11 | 6.1 | 159 | 2.0 | None |
| 5-2 | 29 | 2 | 0.17 | 8.0 | 0.10 | 5.8 | 160 | 2.3 | None |
| Comparative example | | | | | | | | | |
| 5-1 | 41 | 1.05 | 0.20~0.15 | 12.0~9.8 | 0.13~0.07 | 11.2~10.1 | 101 | 0.9 | Undulation appreciated |
| 5-2 | 15 | 2.5 | 0.25~0.11 | 18.1~11.2 | 0.17~0.04 | 14.4~9.2 | 98~72 | 0.8 | None |

EXAMPLE 6

This Example was intended to show the effects of molecular weight of resins used. The procedure of Example 1 was followed except that commercially available polypropylenes (homopolymer of propylene) having different molecular weights respectively as shown in the following Table A.

TABLE A

| Resin used | M.F.I. | Melting point | Density |
|---|---|---|---|
| 1 | 7.5 | 168° C. | 0.91 |
| 2 | 2.0 | 168° C. | 0.90 |
| 3 | 0.5 | 168° C. | 0.91 |

TABLE 6

| | | Original sheet Haze | Rolled sheet Haze | Bottom thickness | Bottom haze | Side wall thickness | Wall haze | Wall gloss | Buckling strength | Low-temperature impact strength | | Sagging of sheet at the time of thermo- |
|---|---|---|---|---|---|---|---|---|---|---|---|---|
| | M.F.I. | (%) | (%) | (mm) | (%) | (mm) | (%) | (%) | (Kg) | −10° C. | −30° C. | forming |
| Example | | | | | | | | | | | | |
| 6-1 | 7.0 | 41 | 23 | 0.17 | 6.9 | 0.10 | 5.0 | 162 | 2.1 | 4/10 | 10/10 | None |
| 6-2 | 2.0 | 62 | 36 | 0.18 | 7.5 | 0.10 | 5.1 | 167 | 2.9 | 1–2/10 | 3–4/10 | None |
| 6-3 | 0.5 | 78 | 49 | 0.18 | 7.5 | 0.12 | 5.5 | 164 | 3.5 | 0–1/10 | 0–3/10 | None |

EXAMPLE 7, COMPARATIVE EXAMPLE 7

This Example was intended to show the effects of thermoforming conditions. The procedure of Example 1 was followed except that sheet temperatures at the time of thermoforming, thermoforming method and thermoforming pressure are varied as shown in Table 7, thereby to obtain thermoformed containers. The results are shown in Table 7.

In the press forming (matched mold die forming), there were used a die and a plug, plated with hard chromium, which have a nominal gap 0.1 mm. The die size, plug surface temperature, sheet pre-heating time and thermoforming time were the same as those used in Example 1.

the cup being buckled. Ten applied loads so measured are averaged to obtain mean value.

(4) Low-temperature impact strength

Ten cups to be tested are immersed in isopropyl alcohol (IPA) respectively at −10° C. and −30° C. for 10 minutes and withdrawn from the liquid, after which a weight (152 g) is let to fall onto the bottom of each of the cups. The low-temperature impact strength is expressed by the following formula:

$$\frac{\text{No. of cups broken}}{\text{No. of cups tested (10 cups)}}$$

(5) Gloss of cup wall surface

TABLE 7

| | Thermoforming method | Sheet temperature (°C.) | Differential pressure (Kg/cm²) | Properties of container | | | | | Thermoformability |
|---|---|---|---|---|---|---|---|---|---|
| | | | | Bottom thickness (mm) | Bottom haze (%) | Side wall thickness (mm) | Wall haze (%) | Wall gloss (%) | |
| Example 7-1 | Air-pressure forming (Plug-assist) | 150 | 2 | 0.17 | 6.8 | 0.10 | 6.0 | 160 | The container shape obtained was not thoroughly as expected. |
| 7-2 | Air-pressure forming (Plug-assist) | " | 2.5 | 0.18 | 7.9 | 0.10 | 5.3 | 163 | Satisfactory |
| Comparative example 7-1 | Air-pressure forming (Plug-assist) | 175 | 2 | 0.21–0.10 | 18< | 0.20–0.07 | 18< | 51 | Non-uniformity of thickness of sheet was appreciated. |
| 7-2 | Air-pressure forming (Plug-assist) | " | 2.5 | 0.25–0.08 | 17< | 0.15–0.07 | 15< | 57 | Non-uniformity of thickness of sheet was appreciated. |
| 7-3 | Vacuum forming (Plug-assist) | 150 | Atmospheric pressure | Entirely impossible to form | | | | | — |
| 7-4 | Vacuum forming (Plug-assist) | 175 | Atmospheric pressure | Entirely impossible to form | | | | | — |
| Example 7-3 | Press forming (Matched mold die) | 150 | 2.5 | 0.15 | 5.1 | 0.16 | 5.2 | 170 | Satisfactory |

The test methods used in the aforesaid Examples and Comparative examples are as follows.

(1) Haze ASTM D-1003
(2) Side wall thickness
  Mean value obtained by averaging 10 thicknesses measured at ten points, circumferentially equally spaced from each other, of the central part of side wall of a cup to be tested.
(3) Buckling strength
  A plate is placed on each of 10 cups to be tested and a load is applied to the plate at a compression rate of 50 mm/min. by the use of a Tensilon tester, to measure the applied load by a compression type load cell at the time of the side wall of Measured in accordance with JIS (Japanese Industrial Standard) Z 8741. 45° specular gloss value.

(6) Sheet surface roughness
  Measured by surface roughness meter (SE-4 type, produced by Kosaka Laboratory, Japan).
(7) Roll surface roughness
  Measured in accordance with JIS (Japanese Industrial Standard) B0601-55.

RMS (Root Mean Square)

Referring to the accompanying drawing, "RMS" is represented by the following formula $$\frac{\sqrt{\sum_{n=1}^{n} a_n^2 + \sum_{n=1}^{n} b_n^2}}{2n}$$

wherein $a_1, \ldots a_n$, and $b_1, \ldots b_n$ are each the perpendicular distance ($\mu$m) between the vertex and the base of a triangle defined by a zig-zag curve B indicating the unevenness (protrusions and depressions) of the surface of a sheet and a straight line A drawn to intersect any inclined portions of the zig-zag curve, and n is the number of the protrusions or depressions.

What is claimed is:

1. A process for producing molded containers comprising the steps of:
    (a) passing, under non-lubrication rolling conditions, a crystalline polyolefin resin melt in sheet form at 220° to 250° C. through between rolls each having a surface roughness of not higher than 1S, as determined according to JIS B0601-55, and a surface temperature of not higher than 50° C. while simultaneously contacting both faces of the resin melt in sheet form with the rolls respectively, followed by still contacting at least one of the faces of the sheet with the roll or other rolls having the same surface roughness, to solidify the resin melt in sheet form thereby obtaining a sheet having a surface roughness of not higher than 0.7$\mu$ RMS on each face,
    (b) further passing, under non-lubrication rolling conditions, the thus obtained sheet through between at least one pair of rolls having a surface roughness of not more than 0.8S and rotating in the direction opposite to each other and having therebetween a clearance smaller than the thickness of the sheet while maintaining the sheet at lower than the crystalline melting point thereof, to roll the sheet in a rolling ratio of 1.1–2.0 thereby obtaining a rolled, oriented sheet and then
    (c) forming the thus obtained rolled sheet under pressure while maintaining the rolled sheet at lower than the crystalline melting point thereof by not more than 40° C., thereby to obtain the molded articles.

2. A process according to claim 1, wherein the crystalline polyolefin resin is a member selected from the group consisting of homopolymers of propylene, ethylene and butene-1, copolymers composed mainly of at least one of said olefins and mixtures of the homopolymers and copolymers.

3. A process according to claim 1, wherein the forming of step (c) is air-pressure or press forming.

4. A process according to claim 1, in which the sheet is maintained at 70°–120° C. in step (b).

* * * * *